Patented Apr. 29, 1952

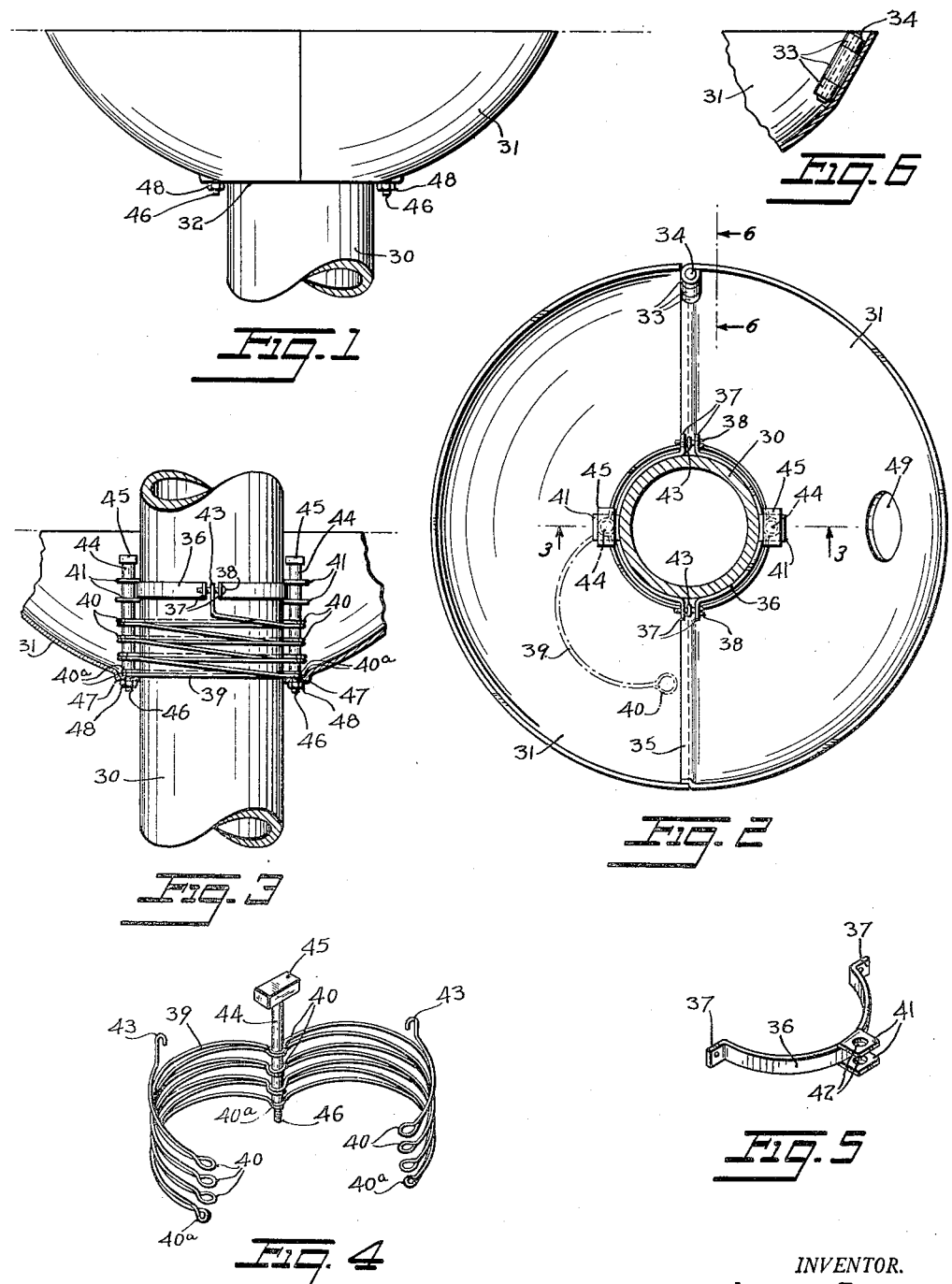

2,594,843

UNITED STATES PATENT OFFICE 2,594,843

SPRING CANOPY FOR PIPES

Irving Barfus, Brooklyn, N. Y.

Application February 23, 1949, Serial No. 77,770

3 Claims. (Cl. 126—317)

This invention relates to new and useful improvements in so-called canopies or finishing off "plates" for use around a riser pipe where it extends upwardly through a suitable opening in a ceiling.

The conventional finishing off plate is a dished or bowl-like shell having an upper circular rim for being set against the ceiling.

The object of the invention is to provide a novel and valuable combination of parts incorporating a finishing off plate and a means including an adjustable spring for securing the plate to the pipe and this in a way to maintain the plate close to the ceiling regardless of changes of length of the pipe due to expansion and contraction thereof in accordance with variations in the temperature of the steam or other contents of the pipe.

A feature of the present invention is that an exceedingly simple and practicable arrangement is provided, and one involving the use of a coil spring element, and an arrangement further characterized by the fact that the finishing off plate may first be slipped along the pipe up against the celing, and thereafter may be anchored in place on the pipe by means inclusive of said coil spring element for maintaining the plate against the ceiling under changing conditions of the pipe due to expansion and contraction thereof.

Another object of the present invention proposes the construction of a completely separable canopy which can be engaged about the riser pipes when completely assembled; for instance, as a replacement unit.

It is a further object of this invention to construct an improved canopy for engagement on riser pipes which is simple and durable and which can be manufactured at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a finishing off plate constructed in accordance with the present invention and shown applied to a riser pipe.

Fig. 2 is an enlarged plan view of Fig. 1 with the riser pipe shown in section.

Fig. 3 is a partial vertical sectional view taken on the line 3—3 of Fig. 2.

Fig. 4 is a perspective view of the spring members in their open position.

Fig. 5 is a perspective view of one of the ring halves.

Fig. 6 is an enlarged partial vertical sectional view taken on the line 6—6 of Fig. 2.

The canopy or finishing off plate, according to the present invention, is shown applied to a riser pipe 30 and includes a cup-shaped shell 31 formed at its bottom with an opening 32 for the passage of the riser pipe 30. The shell 31 is formed of separate sections arranged to open along a line which extends diametrically through the opening 32 from one side to the other of the shell. At one side of the shell 31, the sections are formed with interengaged tubular bosses 33 through which a pin 34 is engaged for pivotally connecting the sections of the shell 31 together. One section of the shell 31 is formed with an inwardly bent edge portion 35, see Fig. 2, which overlaps the inside face of the other shell section in the closed position thereof.

Fixedly mounted about the riser pipe 30 within the shell 31, there is a ring 36. The ring 36 is formed of like halves and the adjacent ends thereof are formed with facing flanges 37 through which screws 38 are passed for securing the halves of the ring 36 in position about the riser pipe 30 within the shell 31.

Disposed within the shell 31 there is a contraction spring 39 also formed of like halves. Each of the halves of the contraction spring is made from a continuous piece of wire material. The wire is reversely bent and at the ends of each bend each half of the contraction spring 39 is formed with loops 40. The lowermost loops 40ª on each side of the halves of the spring 39 are smaller than the other loops, for a purpose which will become clear as this specification proceeds.

Each of the halves of the ring 36 between the flanges 37, is formed with a pair of superimposed laterally extending lugs 41. The lugs 41 are formed with aligned apertures 42. The top end of each half of the spring 39 is formed with a hook 43 which is engaged over the respective screw 38 of the ring 36 at one side of the riser pipe 30. Rod-like members 44 are slidably extended through the apertures 42 of the lugs 41. The top ends of the rod-like members 44 are formed with enlarged heads 45 which rest on the top faces of the topmost lugs 41. The rod-like members 44 are slidably extended through the aligned loops 40 of the adjacent sides of the halves of the contraction spring 39.

The bottom ends of the rod-like members 44 are formed with reduced threaded portions 46 and the lowermost loops 40ª of the halves of the contraction spring 39 are of a size conformed to the diameter of the threaded portions 46. The threaded portions 46 are extended through the lowermost loops 40ª with those loops 40ª engaged against the bottom ends of the thicker portions of the rod-like members 44 so that downward movement of the rod-like members 44 will exert a force tending to stretch the contraction spring 39.

After being engaged through the lowermost loops 40ª of the spring 39, the reduced threaded portions 46 are then passed through complementary holes 47 formed in the halves of the shell 31 and are secured in position by nuts 48. One of the halves of the shell 31 is formed with a side opening 49 to permit assembly of the canopy.

The method of assembling the canopy of this modification of the invention is as follows:

The halves of the ring 36 are engaged about the riser pipe 30 and secured in position by tightening the screws 38 into the flanges 37. One of the rod-like members 44 is then slipped through the aligned apertures 42 of the superimposed lugs 41 on one side of the ring 36. The halves of the contraction spring 39 are then arranged with their loops 40 and 40ª on one side thereof aligned and is slipped upward onto the one rod-like member 44 which is depending from the lugs 41 on one side of the ring 36. The small lowermost loops 40ª of that side are engaged with the reduced threaded portion 46 of that rod-like member 44. The shell 31 is then opened and the section, opposed to the section formed with the side opening 49, then has its hole 47 engaged with the reduced threaded portion 46 and the nut 48 is tightened in position.

The halves of the spring 39 are then closed and the hooks 43 are engaged with the screws 38 between the flanges 37, as shown in Fig. 8. This closing of the halves of the spring 39 will align the loops 40 and 40ª at the other side of the spring 39 with each other and also align the aligned loops 40 and 40ª with the apertures 42 of the lugs 41 at the other side of the ring 36. The other rod-like member 44 is then passed downward through the apertures 42 of the other lugs 41 and through the aligned loops 40 with the reduced threaded portion 46 of that rod-like member extended through the aligned lowermost smaller loops 40ª. The section of the shell 31 formed with the side opening 49 is then pivoted to its closed position, but as the contraction spring holds the adjacent rod-like member 44, the last one engaged in position, in an elevated position, a tool, such as a screw-driver, must be inserted through the side opening 39 to press downward on the enlarged head 45 of that rod-like member 44 and lower that rod-like member 44 against the action of the contraction spring 39 to project the reduced threaded portion 46 of that rod-like member through the hole 47 of the section of the shell 31 having the side opening 49. While holding that rod-like member lowered, the nut 48 is tightened onto that latter reduced threaded portion 46 and the assembly of the canopy is completed and the tool may be withdrawn from the side opening 49. If the ring 36 was properly positioned on the riser pipe 30, the contraction spring 39 will exert a force which will hold the top edges of the shell 31 in contact with the surface of the ceiling about the riser pipe 30. To remove the canopy the above procedure is reversed.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A canopy for engagement about a riser pipe in contact with a ceiling surface surrounding the riser pipe, comprising a hollow cup-shaped shell formed at its bottom with an opening through which the riser pipe is adapted to extend, said shell being formed of openable halves pivotally connected together, a ring adapted to be removably engaged about the pipe within said shell, rod-like members depending from said ring and having reduced bottom threaded portions passing through complementary holes formed in said shell, nuts threaded onto the projecting ends of said reduced threaded portions connecting said shell to said rod-like members, and a removable contraction spring adapted to be engaged about the riser pipe and connected to said ring and said reduced threaded portions for holding said shell in an elevated position on the riser pipe in engagement with the ceiling surface.

2. A canopy for engagement about a riser pipe in contact with a ceiling surface surrounding the riser pipe, comprising a hollow cup-shaped shell formed at its bottom with an opening through which the riser pipe is adapted to extend, said shell being formed of openable halves pivotally connected together, a ring adapted to be removably engaged about the pipe within said shell, rod-like members depending from said ring and having reduced bottom threaded portions passing through complementary holes formed in said shell, nuts threaded onto the projecting ends of said reduced threaded portions connecting said shell to said rod-like members, and a removable contraction spring adapted to be engaged about the riser pipe and connected to said ring and said reduced threaded portions for holding said shell in an elevated position on the riser pipe in engagement with the ceiling surface, said ring being formed of separate halves adapted to be retained in position about the riser pipe by screws passed through flanges formed on the adjacent ends of the halves of said ring.

3. A canopy for engagement about a riser pipe in contact with a ceiling surface surrounding the riser pipe, comprising a hollow cup-shaped shell formed at its bottom with an opening through which the riser pipe is adapted to extend, said shell being formed of openable halves pivotally connected together, a ring adapted to be removably engaged about the pipe within said shell, rod-like members depending from said ring and having reduced bottom threaded portions passing through complementary holes formed in said shell, nuts threaded onto the projecting ends of said reduced threaded portions connecting said shell to said rod-like members, and a removable contraction spring adapted to be engaged about the riser pipe and connected to said ring and said reduced threaded portions for holding said shell in an elevated position on the riser pipe in engagement with the ceiling surface, said ring being formed of separate halves adapted to be retained in position about the riser pipe by screws passed through flanges formed on the adjacent ends of the halves of said ring, said spring being formed of separate sections formed along their adjacent edges with aligned loops, said lowermost loops being of a size corresponding to the diameter of said reduced threaded portions of said rod-like members and clamped in position thereon between the adjacent faces of said shell and the bottom ends of the enlarged upper portions of said rod-like members, and hooks formed on the tops of the halves of said spring and engaged with said screws.

IRVING BARFUS.

REFERENCES CITED

The following references are of record in the file of this patent:

UNITED STATES PATENTS

| Number | Name | Date |
|---|---|---|
| 386,671 | Waggoner | July 24, 1888 |
| 443,487 | Felton | Dec. 23, 1890 |
| 463,781 | Tew | Nov. 24, 1891 |
| 530,394 | Chamberlain | Dec. 4, 1894 |
| 756,479 | Drozeski | Apr. 5, 1904 |
| 1,918,722 | Sweeney | July 18, 1933 |